United States Patent [19]
Inuiya et al.

[11] Patent Number: 5,473,441
[45] Date of Patent: Dec. 5, 1995

[54] VIDEO SIGNAL REPRODUCTION PROCESSING METHOD AND APPARATUS FOR REPRODUCTION OF A RECORDED VIDEO SIGNAL AS EITHER A SHARP STILL IMAGE OR A CLEAR MOVING IMAGE

[75] Inventors: Masafumi Inuiya, Asaka; Kazuyuki Masugane, Miyagi, both of Japan

[73] Assignee: Fuji Photo Film Co., Ltd., Japan

[21] Appl. No.: 73,474

[22] Filed: Jun. 9, 1993

[30] Foreign Application Priority Data

| Jun. 12, 1992 | [JP] | Japan | 4-177757 |
| Jun. 12, 1992 | [JP] | Japan | 4-177758 |

[51] Int. Cl.$^6$ .................................................. H04N 9/79
[52] U.S. Cl. ...................... 358/312; 358/335; 358/906; 358/330; 360/33.1; 360/10.1; 348/607; 348/701; 348/702
[58] Field of Search ...................... 358/310, 312, 358/335, 330, 906, 340, 314, 328, 327; 348/384, 606, 607, 620, 700, 701, 702; 360/33.1, 28, 29, 10.1, 8, 9.1, 10.3; H04N 5/76, 9/79

[56] References Cited

U.S. PATENT DOCUMENTS

| 4,873,585 | 10/1989 | Blanton et al. | 358/335 |
| 5,005,081 | 4/1991 | Asano | 348/620 |
| 5,113,255 | 5/1992 | Nagata et al. | 348/384 |
| 5,140,433 | 8/1992 | Kuroda | 358/339 |
| 5,140,434 | 8/1992 | Van Blessinger et al. | 358/335 |

Primary Examiner—Tommy P. Chin
Assistant Examiner—Khoi Truong

[57] ABSTRACT

Both a sharp print image and a natural reproduced move image can be obtained from a signal recorded on a recording medium. A recording signal, read from the recording medium, is converted into digital data and is delayed by one field. Data representing the current image in the n-th field and data representing an image in the (n−1)-th field one field ahead of the current image, are applied to a subtracting circuit, to extract a component representing moving image portions. An interpolated image for making movement correction is created from the extracted component representing the moving image portions by an interpolating circuit. Data representing the interpolated image and the data representing the current image in the n-th field are synthesized by a synthesizing circuit, to output composite data as data representing an image which has been subjected to movement correction. Since the image is subjected to the movement correction, a natural reproduced movie image smoothly moving is obtained even when the recording signal is recorded at high shutter speed.

10 Claims, 12 Drawing Sheets

VIDEO SIGNAL REPRODUCTION PROCESSING METHOD AND APPARATUS FOR REPRODUCTION OF A RECORDED VIDEO SIGNAL AS EITHER A SHARP STILL IMAGE OR A CLEAR MOVING IMAGE

BACKGROUND OF THE INVENTION

1. Field of the Invention

The present invention relates to an apparatus for and a method of reading and reproducing a video signal recorded on a recording medium such as a magnetic tape.

2. Description of the Background Art

A video signal representing an image of a subject pickied up by a movie video camera is recorded on, for example, a magnetic tape and is preserved therein. The video signal recorded on the magnetic tape is read and reproduced by a reproducing (or playback) apparatus, so that the image of the subject is projected on a television connected to the reproducing apparatus. There is also a reproducing apparatus to which a printer can be connected. If a printer is connected to such a reproducing apparatus, a signal for a print image is outputted from the reproducing apparatus, and an image of a subject is printed by the printer and is outputted.

Consider a case where a subject is picked up at low shutter speed. If the subject is moving, an image of the subject printed by the printer may be blurred in many cases. In order to prevent the image of the subject from being blurred when the image of the subject is printed, it was considered that the subject is previously picked up at high shutter speed and recorded. In this case, the image of the subject printed becomes a sharp image which is not blurred. When the image of the subject is projected as a movie image on the television, however, since the image of the subject is sharply recorded frame by frame, the movement of the subject becomes unnatural, to make it hard to see the image of the subject.

In obtaining both a sharp print image from the signal recorded on the magnetic tape and a natural reproduced movie image there is a conflict.

SUMMARY OF THE INVENTION

An object of the present invention is to make it possible to obtain a sharp print image from a signal recorded on a recording medium and to also obtain a natural reproduced movie image.

A video signal reproduction processing apparatus according to the present invention comprises: reading means for reading, from a recording medium on which a modulated movie video signal representing an image of a subject picked up at high shutter speed is recorded, a video signal; reproduction processing means for subjecting the video signal read by the reading means to reproduction processing including demodulation to obtain a reproduced first video signal; extracting means for extracting, on the basis of the reproduced first video signal representing a current image frame and a video signal representing a preceding image one frame ahead of the current image frame, a difference signal representing moving image portions; interpolated image creating means for generating a signal representing an interpolated image based upon an interpolation of the extracted difference signal to thereby blur the moving image portions; and synthesizing means for synthesizing the first video signal representing the current image frame and the generated signal representing the interpolated image to obtain a second video signal capable of being reproduced as either a sharp printed image or a natural movie image.

Furthermore, the present invention provides a reproduction processing method of the above described video signal.

Imaging at high shutter speed is imaging at a shutter speed higher than a shutter speed (1/60 sec.) for ordinary video imaging. In addition, the video signal includes video data.

Further one frame can refer to both a frame and a field. That is, the image one frame ahead of the current image includes an image one field ahead of the current image.

According to the present invention, the movie video signal representing the image of the subject picked up at a high shutter speed is recorded on the recording medium. When the movie video signal is outputted to make movie reproduction of the image of the subject, the signal representing the moving image portions, i.e. differences between the current image, and the preceding image is extracted. The signal representing the interpolated image is generated from the extracted signal representing the moving image portions, and the signal representing the interpolated image and the video signal representing the current image are synthesized.

An interpolated image representing the moving image portions, differences between the current image, and the preceding image is created. Consequently, when the movie video signal is reproduced to project the image of the subject on a television or the like, a natural image smoothly moving is obtained. In addition, the movie video signal representing the image of the subject picked up at high shutter speed is recorded on the recording medium. Thus, even when a print image is obtained, a sharp image can be obtained.

In the foregoing, the extraction processing of the signal representing the moving image portions, the generation processing of the signal representing the interpolated image, and the synthesis processing may be performed with respect to a luminance signal component of the video signal or may be performed with respect to each of a luminance signal component and a chrominance signal component of the video signal.

Furthermore, the first video signal and the second video signal may be so switched and outputted that the first video signal is a print image output, a slow-motion output or a still image output, and the second video signal is a movie image output.

Additionally, a video signal reproduction processing apparatus according to the present invention comprises: reading means for reading, from a recording medium on which a modulated movie video signal representing an image of a subject picked up at high shutter speed is recorded, a video signal, reproduction processing means for subjecting the video signal read by the reding means to reproduction processing including demodulation to obtain a reproduced first video signal; extracting means for extracting, on the basis of the reproduced first video signal representing a current image frame and a video signal representing a preceding image one frame ahead of the current image frame, a difference signal representing moving image portions; detecting means for detecting a luminance difference between the signal representing the moving image portions and the video signal representing the current frame; and low-pass filtering means for removing a high frequency component of the video signal representing the current image in a region where the luminance difference detected by the luminance difference detecting means is small.

Furthermore, the present invention provides a reproduction processing method of the above described video signal.

The video signal representing the image of the subject picked up at high shutter speed is recorded on the recording medium. When movie reproduction is made, the signal representing the moving image portions in the current image and the preceding image is extracted, and the luminance difference between the extracted signal representing the moving image portions and the video signal representing the current image is detected. The high frequency component of the video signal representing the current image in the region where the luminance difference is small is removed.

The high frequency component is removed with respect to the moving image portion in the current image, so that the moving image portion is blurred. When the movie reproduction is made, therefore, a natural image smoothly moving is obtained.

The video signal representing the image of the subject picked up at high shutter speed is recorded on the recording medium. Even when a print image is obtained, therefore, a sharp image can be obtained.

A video signal reproduction processing apparatus according to the present invention comprises: reading means for reading, from a recording medium on which a modulated movie video signal representing an image of a subject picked up at high shutter speed is recorded, the video signal; reproducing means for subjecting the video signal read by the reading means to reproduction processing including demodulation to obtain a reproduced video signal; motion vector generating means for generating a motion vector of each of pixels included in the current image represented by the reproduced video signal; and digital low-pass filtering means for low-pass filtering the reproduced video signal using a filter table in which a weighted signal is varied depending on a direction and a magnitude of the motion vector generated by the motion vector generating means and outputting the low-pass filtered video signal.

Furthermore, the present invention provides a reproduction processing method of the above described video signal.

According to the present invention, the motion vector of each of the pixels included in the current image represented by the reproduced video signal read from the recording medium is generated. The reproduced video signal is subjected to low-pass filtering processing using the filter table in which the weighted signal is varied depending on the direction and the magnitude of the generated motion vector.

Since the signal representing the moving image portion in the current image is low-pass filtered, the continuity of the image of the subject is emphasized, to thereby obtain a natural reproduced movie image moving smoothly.

The motion vector generation processing and the low-pass filtering processing may be performed with respect to a reproduced luminance signal or may be performed with respect to each of a reproduced luminance signal and a reproduced chrominance signal.

Furthermore, the motion vector generating means may create a motion vector at a representative point in the current image from the reproduced video signal representing the current image and the video signal representing the preceding image one frame ahead of the current image frame, and generate the motion vector of each of the pixels included in the current image from the created motion vector at the representative point.

The present invention provides a video signal processing method comprising the steps of picking up a subject at a high shutter speed to obtain a movie video signal representing an image of the subject; detecting the movement of the image of the subject represented by the movie video signal and the magnitude of the movement; subjecting the movie video signal to processing so as to give a component representing the continuity of the image of the subject to the movie video signal or emphasize the continuity of the image of the subject depending on the detected movement of the image of the subject and the detected magnitude of the movement.

A video signal reproduction processing apparatus according to the present invention comprises reading means for reading, from a recording medium on which a modulated movie video signal representing an image of a subject picked up at high shutter speed is recorded, the video signal; reproduction processing means for subjecting the video signal read by the reading means to reproduction processing including demodulation to obtain a reproduced video signal; defusing means for processing the reproduced video signal representing the current image and a video signal representing the preceding image one frame ahead of the current image so that the contours of the current frame, and the preceding image are respectively blurred; extracting means for extracting a signal representing a moving image portion whose contour is blurred in the current image on the basis of the signals representing the current image and the preceding image whose contours are respectively blurred by the defusing means; and synthesizing means for synthesizing the signal representing the moving image portion which is extracted by the extracting means and the signal representing the current image to output a signal representing a composite image.

Furthermore, the present invention provides a reproduction processing method of the above described video signal.

In the foregoing, imaging at high shutter speed is imaging at a higher speed than shutter speed for ordinary video imaging (1/60 sec). In addition, an image one frame ahead of the current image may be an image one field ahead of the current image.

According to the present invention, the signal representing the current image read from the recording medium and the signal representing the preceding image one frame ahead of the current image frame are respectively processed so that the contours of the current image and the preceding image are respectively blurred. The signal representing the moving image portion whose contour is blurred in the current image is extracted from the signals representing the the current image and the preceding image, and the extracted signal representing the moving image portion and the signal representing the current image are synthesized.

The contour of the moving image portion in the current image is blurred, the signal representing the moving image portion in the current image and the signal representing the current image are synthesized, and the signal representing the composite image is outputted. Accordingly, when the movie video signal is reproduced to protect the image of the subject on a television or the like, a natural image smoothly moving is obtained.

A video signal reproduction processing apparatus according to the present invention comprises reading means for reading, from s recording medium on which a modulated movie video signal representing an image of a subject picked up at high shutter speed is recorded, the video signal; reproduction processing means for subjecting the video signal read by the reading means to reproduction processing including demodulation to obtain a reproduced video signal; delaying means for delaying the reproduced video signal by one image frame, and synthesizing means for synthesizing the reproduced video signal representing the current image and the reproduced video signal, which is delayed by the delaying means, representing the preceding image one frame ahead of the current image frame to output a signal representing a composite image.

Furthermore, the present invention provides a reproduction processing method of the above described video signal.

According to the present invention, the signal representing the current image and the signal representing the preceding image one frame ahead of the current image are synthesized and the signal representing the composite image is outputted. Also in this case, the movement of the image protected on a display device or the like becomes relatively smooth, to obtain a natural reproduced image.

In the foregoing, the correction processing, the extraction processing, and the synthesis processing may be performed on the basis of only a luminance signal component or may be performed on the basis of each of a luminance signal component and a chrominance signal component.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
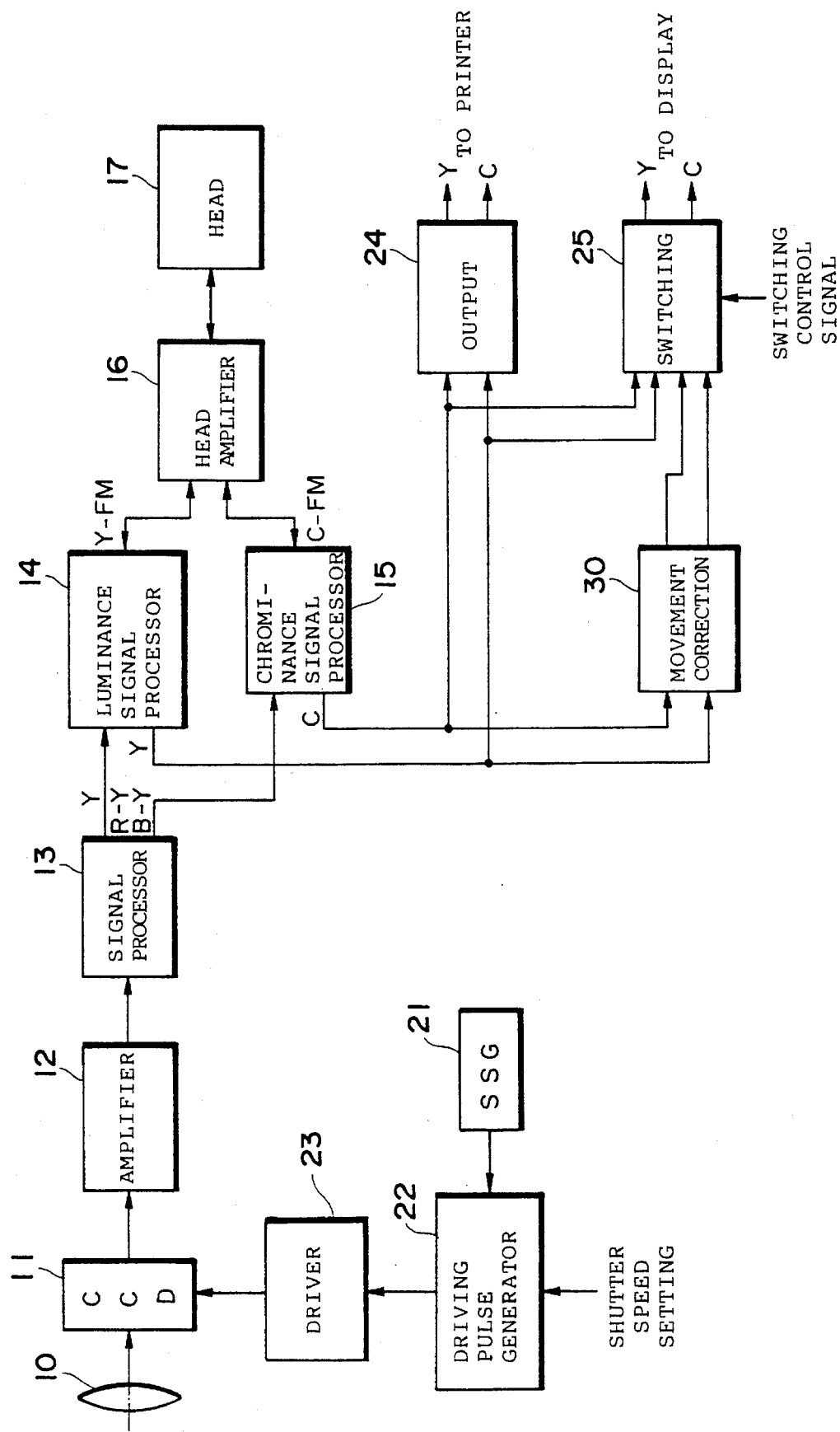
FIG. 1 is a block diagram showing the electrical construction of a movie video camera according to an embodiment of the present invention.

FIG. 1 is a block diagram showing the electrical construction of a movie/still video camera according to an embodiment of the present invention.

An image of a subject is formed on a CCD (Charge Coupled Device) 11 through an imaging lens 10.

A video camera can be switched between a movie mode selected when a video signal representing an image of the subject to be projected on a display device is recorded on a magnetic tape and a print (still) mode selected when a video signal representing an image of the subject to be printed using a printer is recorded on a magnetic tape, When the movie mode is selected, the shutter speed is, for example, 1/60 sec. On the other hand, when the print mode is selected, the shutter speed is high, for example, 1/120 sec. However, this shutter speed is suitably varied depending on a photometric value.

A shutter speed setting signal representing the selected mode is applied to a CCD driving pulse generating circuit 22 which is driven on the basis of a synchronizing signal outputted from a synchronizing signal generating circuit 21. A driving pulse corresponding to the shutter speed setting signal is applied to a driver 23 from the CCD driving pulse generating circuit 22. The CCD 11 is driven by the driver 23.

Signals of the three primary colors R (red), G (green) and B (blue) representing the image of the subject are outputted from the CCD 11 and are amplified by a pre-amplifier 12, to be applied to a signal processing circuit 13.

Separation processing of Y/C (luminance data/chrominance data), generation processing of color difference signals R-Y and B-Y, and the like are performed by the signal processing circuit 13, so that a luminance signal Y and color difference signals R-Y and B-Y are outputted from the signal processing circuit 13. The luminance signal Y and the color difference signals R-Y and B-Y are respectively applied to a luminance signal processing circuit 14 and a chrominance signal processing circuit 15.

The luminance signal Y is frequency-modulated by the luminance signal processing circuit 14. The color difference signals R-Y and B-Y are line-sequenced, to be a chrominance signal C and frequency-modulated by the chrominance signal processing circuit 15.

The luminance frequency-modulated signal (Y-FM) and the chrominance frequency-modulated signal (C-FM) are applied to a magnetic head 17 through a head amplifier circuit 16, to be recorded on the magnetic tape.

The video camera shown in FIG. 1 can perform reproduction processing for reading the frequency-modulated video signal recorded on the magnetic tape and generating a signal output to the printer and a signal output to the display device.

In a reproduction mode, the luminance signal frequency-modulated Y-FM and the chrominance signal frequency-modulated C-FM are read from the magnetic tape by the magnetic head 17 and are applied to the head amplifier circuit 16, to be amplified. The frequency-modulated luminance signal Y-FM amplified is applied to the luminance signal processing circuit 14, to be FM demodulated, and the frequency-modulated chrominance signal C-FM amplified is applied to the chrominance signal processing circuit 15, to be FM demodulated.

Each of the luminance signal Y and the chrominance signal C obtained by the FM demodulation are applied to an output interface 24, a switching circuit 25, and a movement correcting circuit 30.

The movement correcting circuit 30 is a circuit for performing processing for solving the unnaturalness of a reproduced image, when the video signal recorded on the magnetic tape, by selecting the print mode in which the shutter speed is high, is reproduced and is applied to the display device. The luminance signal Y and the chrominance signal C corrected by the movement correcting circuit 30 are applied to the switching circuit 25.

The video signal is outputted from the output interface 24 and is applied to the printer. An image represented by the video signal is printed by the printer.

When the video signal is recorded on the magnetic tape in the print mode, the recording is accomplished at a high shutter speed. Even when an image of a moving subject is printed using the printer, therefore, the image of the subject printed becomes a sharp image which is not blurred.

The switching circuit 25 is a circuit for, in response to a switching control signal, selecting either the output signals of the movement correcting circuit 30, or the output luminance signal Y of the luminance signal processing circuit 14 and the output chrominance signal C of the chrominance signal processing circuit 15 which are not corrected by the movement correcting circuit 30, and for outputting the selected signals.

When the video signal recorded on the magnetic tape in the print mode is reproduced and is displayed on the display device, the switching circuit 25 is so controlled that the signals corrected by the movement correcting circuit 30 are outputted from the video camera. The output signals of the switching circuit 25 are applied to the display device, to obtain a natural reproduced movie image even when the video signal is recorded at the high shutter speed in the print mode.

When the video signal recorded on the magnetic tape in the movie mode is reproduced and is displayed on the display device, the switching circuit 25 is so controlled that the output luminance signal Y of the luminance signal processing circuit 14 and the output chrominance signal C of the chrominance signal processing circuit 15 are outputted from the video camera. The output signals of the switching circuit 25 are applied to the display device, to obtain a reproduced movie image or a reproduced still image represented by the video signal recorded at the shutter speed in the movie mode.

The movement correction processing in the movement correcting circuit 30 may be performed on the basis of only the luminance signal inputted or may be performed on the basis of the luminance signal and the chrominance signal. When the movement correction processing is performed on the basis of only the luminance signal, the inputted chrominance signal is directly outputted without being processed in the movement correcting circuit 30 and is applied to the switching circuit 25.

Figure 2:
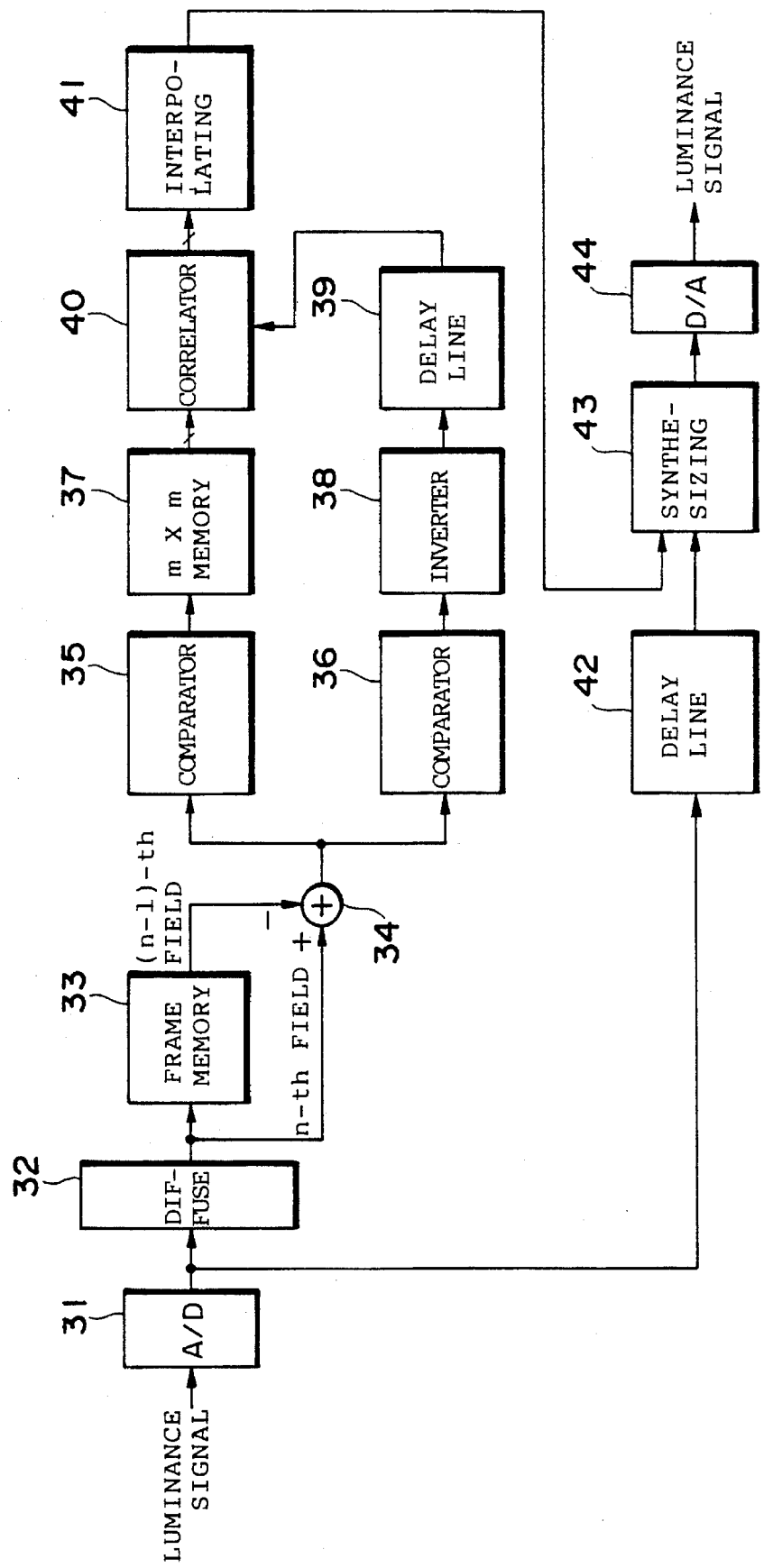
FIG. 2 is a block diagram showing the electrical construction of a movement correcting circuit.

FIG. 2 is a block diagram showing the electrical construction of the movement correcting circuit 30 shown in FIG. 1, and FIGS. 3a to 3h show how an image is subjected to movement correction. The movement correcting circuit shown in FIG. 2 is a circuit for performing correction processing with respect to a luminance signal.

A luminance signal Y outputted from the luminance signal processing circuit 14 (see FIG. 1) is applied to an analog-to-digital (A/D) converting circuit 31, to be converted into digital luminance data. The digital luminance data is applied to a defuse circuit 32 and a delay line 42.

The diffuse circuit 32 is a circuit for transforming a luminance value of each of a plurality of pixels into the average value of luminance values of the pixels around the pertinent pixel. The contour of an image of a subject represented by the luminance data is blurred by the diffuse circuit 32. The diffuse circuit 32 is implemented by, for example, a digital low-pass filter.

The luminance data representing the image of the subject whose contour is blurred by the diffuse circuit 32 is applied to a frame memory 33 and a subtracting circuit 34. The luminance data inputted to the frame memory 33 is delayed by one field, to be applied to the subtracting circuit 34.

Figure 3A:
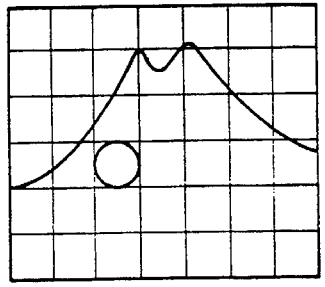
FIGS. 3a to 3h are schematic views showing how movement correction is made.

If the luminance signal inputted to the movement correcting circuit 30 is taken as data representing an image in the n-th field (FIG. 3b), the luminance data outputted from the frame memory 33 is data representing an image in the (n−1)-th field (see FIG. 3a). The subtracting circuit 34 subtracts the data representing the image in the (n−1)-th field from the data representing the image in the n-th field, thereby to extract data representing moving image portions in the image represented by the luminance signal fed to the movement correcting circuit 30 (see FIG. 3c).

Figure 3B:
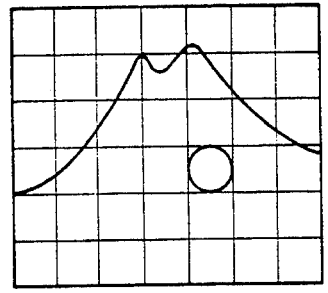
Figure 3C:
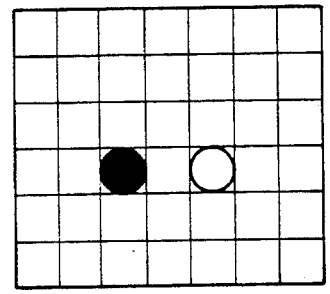
Figure 3D:
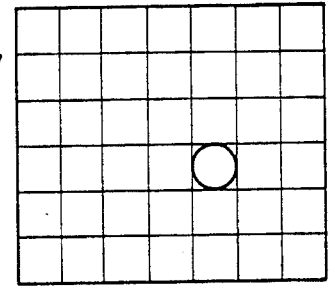
Figure 3E:
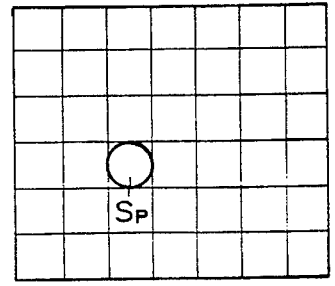
Figure 3F:
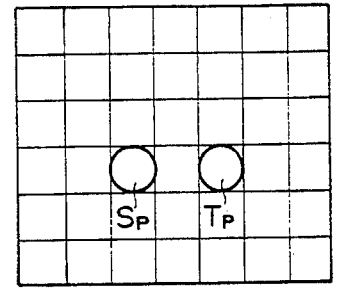
Figure 3G:
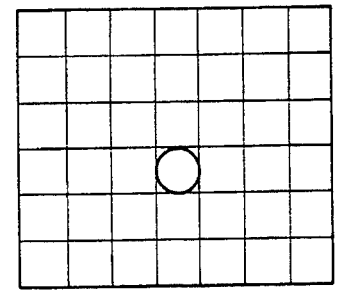

Output data of the subtracting circuit 34 is applied to comparators 35 and 36. The comparator 35 and the comparator 36 are respectively used for removing a signal component at not more than a predetermined level and a signal component at not less than a predetermined level. Only data representing the moving image portion in the image in the n-th field shown in FIG. 3b is extracted by the comparator 35 (see FIG. 3d). On the other hand, only data representing an inverted image of the moving image portion in the image in the (n−1)-th field shown in FIG. 3a is extracted by the comparator 36. The data representing the inverted image is applied to an inverter 38, to be inverted, thereby to obtain data representing the moving image portion in the image in the (n−1)-th field (FIG. 3e).

Output data of the comparator 35 is applied to a memory 37 capable of storing data in a region comprising m ×m pixels, to be stored once therein. The data stored in the memory 37 is applied to a correlator 40. The region comprising m×m pixels may be a region including images Sp and Tp as described later, which allows hardware to be saved.

Output data of the inverter 38 is applied to a delay line 39, to be delayed for a predetermined time. Output data of the delay line 39 is applied to the correlator 40.

The correlator 40 is a circuit for detecting the correlation of images. The correlator 40 detects an image $T_p$ which is most correlated with a moving image $S_p$ shown in FIG. 3e from the image in the region comprising m×m pixels which is represented by the data stored in the memory 37. When the image $T_p$ which is most correlated with the image $S_p$ is detected by the correlator 40 (see FIG. 3f), data representing the images $S_p$ and $T_p$ is applied to an interpolating circuit 41.

The interpolating circuit 41 is a circuit for producing data representing an image interpolated between images on a particular picture. Data representing an image interpolated between the images $S_p$ and $T_p$ is obtained on the basis of the data inputted from the correlator 40 by the interpolating circuit (see FIG. 3g). The data representing the interpolated image created by the interpolating circuit 41 is applied to a synthesizing circuit 43.

The data representing the image in the n-th field outputted from the delay line 42 is also applied to the synthesizing circuit 43. Delay time due to correlation processing, interpolation processing or the like is compensated by the delay line 42.

Figure 3H:
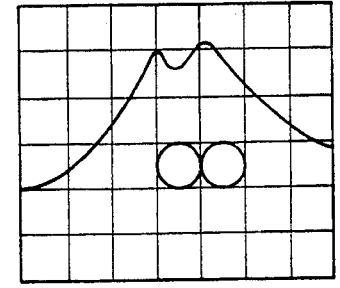

The image in the n-th field and the image created by the interpolation are synthesized by the synthesizing circuit 43 (see FIG. 3h). Data representing a composite image obtained is converted into an analog luminance signal by a digital-to-analog (D/A) converting circuit 44, to be outputted from the movement correcting circuit 30.

When interpolation processing of an image is performed with respect to only the luminance signal, the luminance signal which is subjected to synthesis processing and the chrominance signal in the n-th field which is not subjected to synthesis processing are outputted from the movement correcting circuit 30.

Figure 4:
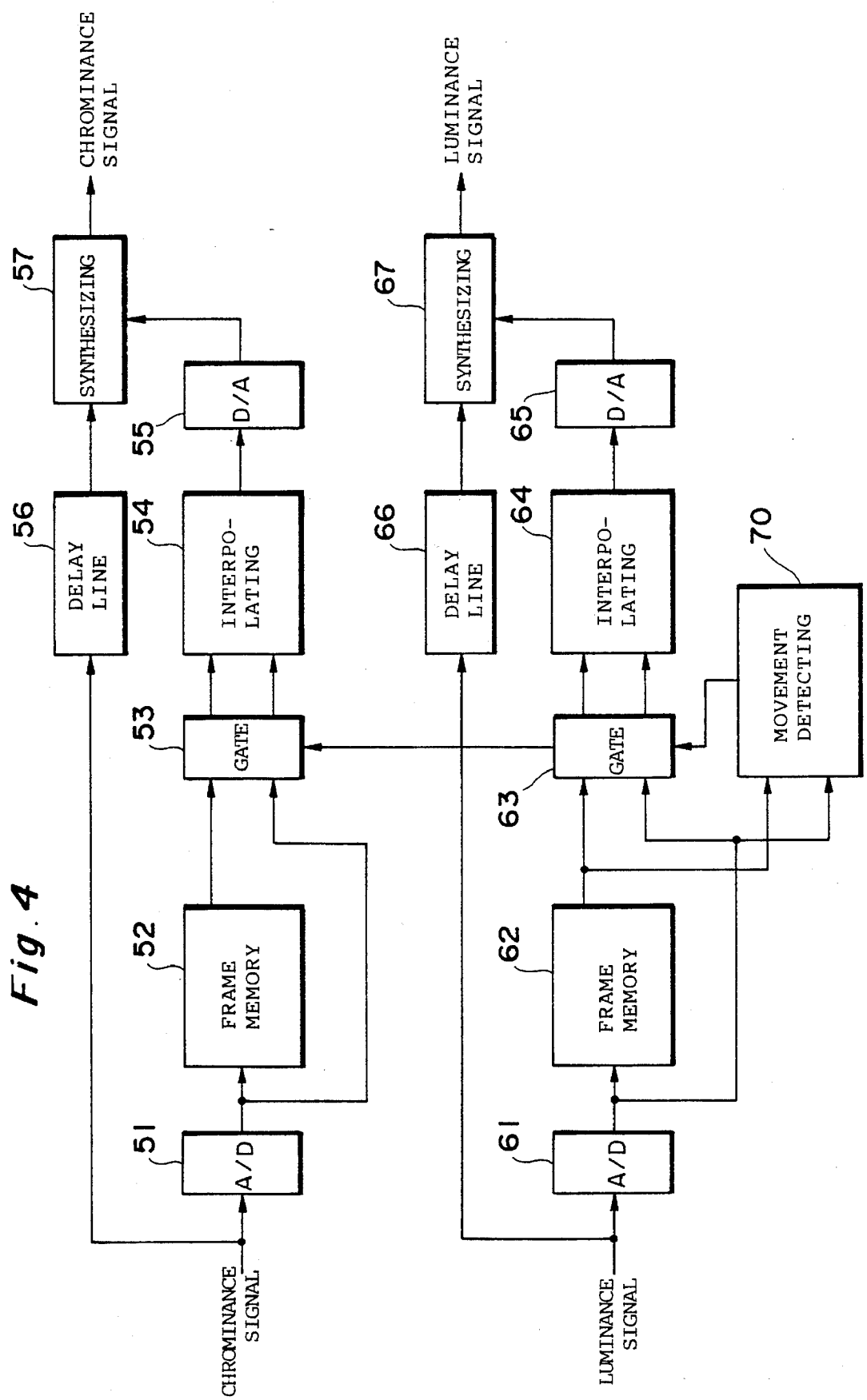
FIG. 4 is a block diagram showing another example of the movement correcting circuit.

FIG. 4 is a block diagram showing the electrical construction of another example of the movement correcting circuit 30 shown in FIG. 1. FIGS. 5a to FIG. 5e show how movement correction is made in the circuit shown in FIG. 4.

In the movement correcting circuit shown in FIG. 4, data representing moving image portions is extracted from luminance data, and an image represented by the luminance data and an image represented by chrominance data are respectively subjected to interpolation processing on the basis of the extracted data representing the moving image portions.

A luminance signal Y inputted to the movement correcting circuit is applied to an analog-to-digital converting circuit 61 and a delay line 66. Luminance data Y obtained by digital conversion by the analog-to-digital converting circuit 61 is applied to a frame memory 62, to be delayed by one field and outputted (see FIG. 5a). Each of the output data of the frame memory 62 and the output data of the analog-to-digital converting circuit 61 (see FIG. 5b) are applied to a movement detecting circuit 70 and a gate circuit 63.

The movement detecting circuit 70 is a circuit for detecting a region including a moving image. Processing almost corresponding to processing performed by the comparators 35 and 36, the memory 37, the inverter 38, the delay line 39 and the correlator 40 is performed by the movement detecting circuit 70 (see FIG. 5c). Data representing a region including a moving image and detected by the movement detecting circuit 70 is applied to the gate circuit 63, so that the data representing the region including the moving image in the data outputted from the frame memory 62 is applied to an interpolating circuit 64 through the gate circuit 63.

Figure 5A:
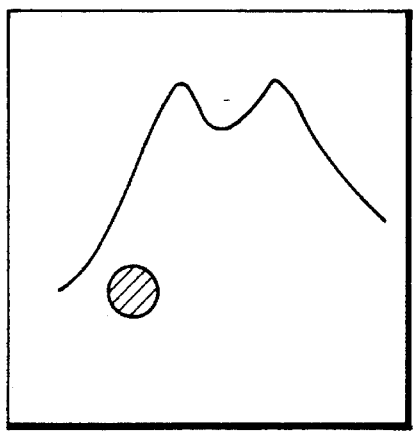
FIGS. 5a to 5e are schematic views showing how movement correction is made in the circuit shown in FIG. 4.
Figure 5D:
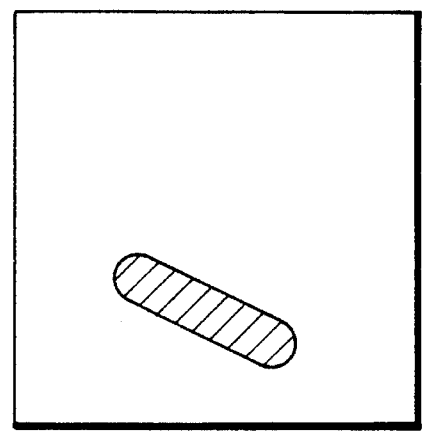
Figure 5B:
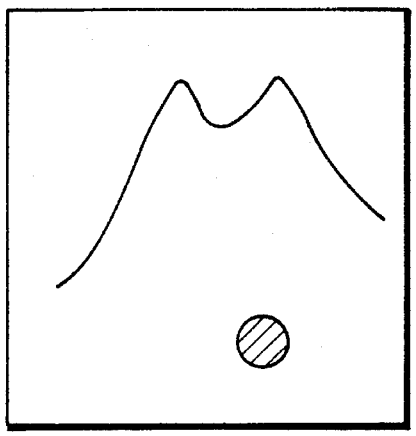

Interpolated image creation processing is so performed by the interpolating circuit 64 that the data representing the moving image portions occupies the whole region detected by the movement detecting circuit 70, so that data representing a created image is converted into an analog luminance signal by a digital-to-analog converting circuit 65 (see FIG. 5d). This analog luminance signal is applied to a synthesizing circuit 67.

Figure 5E:
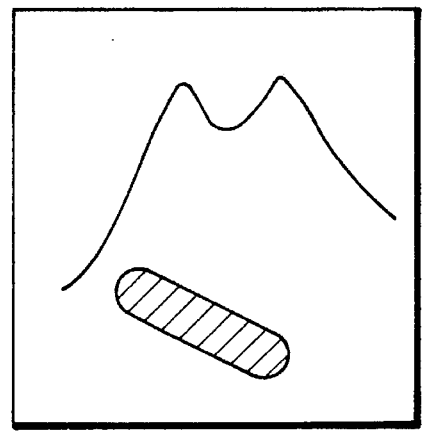
Figure 5C:
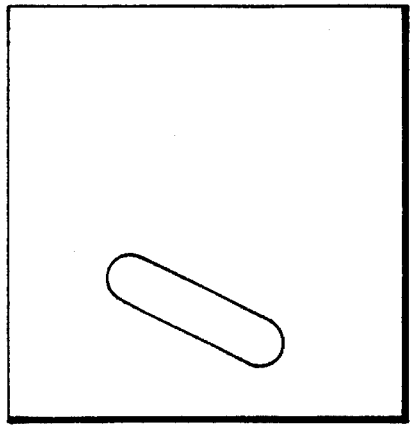

The luminance signal delayed for a predetermined time by the delay line 66 is also inputted to the synthesizing circuit 67, so that the delayed luminance signal and the luminance signal which is subjected to the interpolation processing are synthesized (see FIG. 5e).

Interpolated image creation processing is also performed with respect to a chrominance image represented by the chrominance signal in the movement correcting circuit shown in FIG. 4.

The chrominance signal is also applied to an analog-to-digital converting circuit 51 and a delay line 56. Chrominance data obtained by digital conversion by the analog-to-digital converting circuit 51 is applied to a frame memory 52, to be delayed by one field. The chrominance data which is delayed by one field and the chrominance data which is not delayed are applied to a gate circuit 53.

The data representing the region including the moving image and detected by the movement detecting circuit 70 is also applied to the gate circuit 53, so that the data representing the moving image in the chrominance data outputted from the frame memory 52 is applied to an interpolating circuit 54 through the gate circuit 53.

The interpolated image creation processing is performed by the interpolating circuit 54, and data representing a created image is converted into an analog chrominance signal by a digital-to-analog converting circuit 55. This analog chrominance signal is applied to a synthesizing circuit 57, so that the analog chrominance signal and the chrominance signal which is outputted from the delay line 56 are synthesized and are outputted, similarly to the luminance signal.

The interpolation processing is thus performed with respect to the luminance image and the chrominance image, so that the luminance signal and the chrominance signal are subjected to movement correction processing and are outputted.

Figure 6:
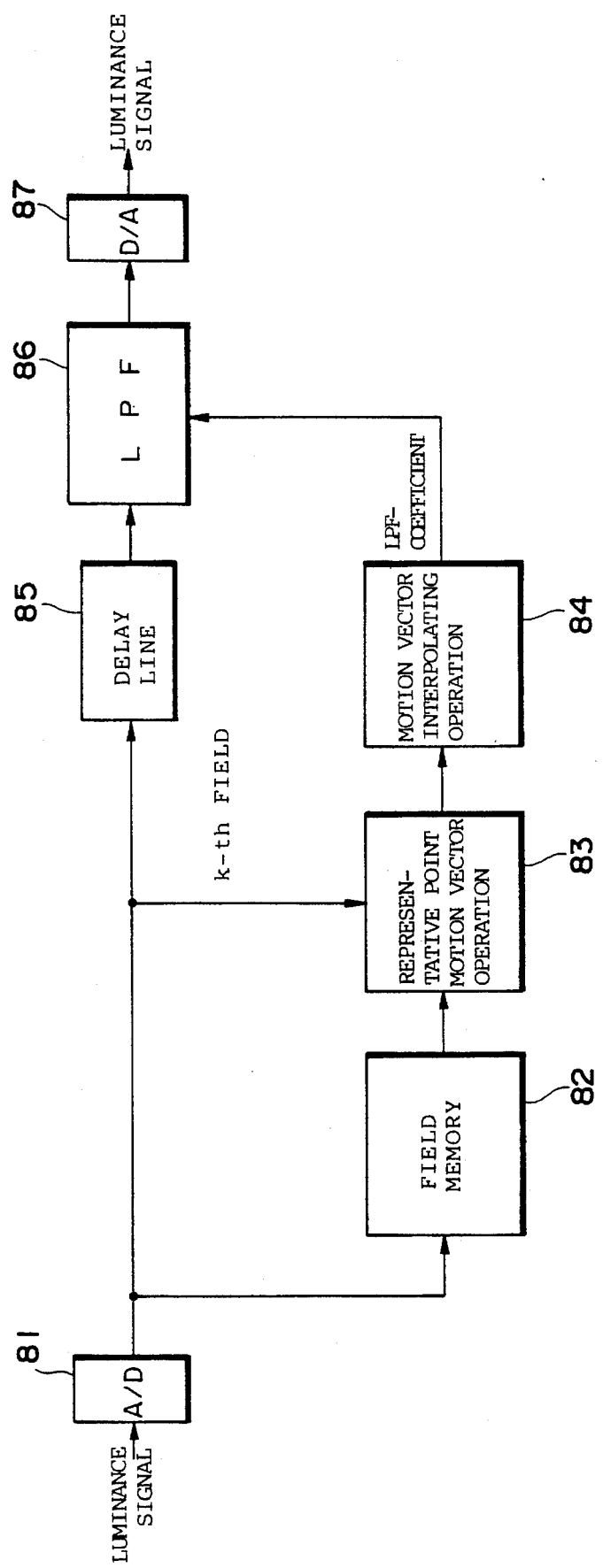
FIG. 6 shows the electrical construction of a filtering circuit.

FIG. 6 shows still another example of the movement correcting circuit 30 shown in FIG. 1, which is a block diagram showing the electrical construction of a filtering circuit for blurring an image of a subject depending on the movement of the subject. Although in this circuit, a luminance signal is subjected to correction processing, a chrominance signal may be also subjected to correction processing.

The luminance signal is applied to an analog-to-digital converting circuit 81, to be converted into digital luminance data. The digital luminance data is applied to a field memory 82, a circuit for calculating a motion vector at a representative point (hereinafter referred to as a representative point motion vector operation circuit) 83, and a delay line 85. The luminance data inputted to the field memory 82 is delayed by one field and is outputted. The luminance data delayed by one field is applied to the representative point motion vector calculating circuit 83. An image represented by the data outputted from the analog-to-digital converting circuit 81 is taken as an image in the k-th field, and an image one field ahead of the image is taken as an image in the (k−1)-th field.

Figure 7A:
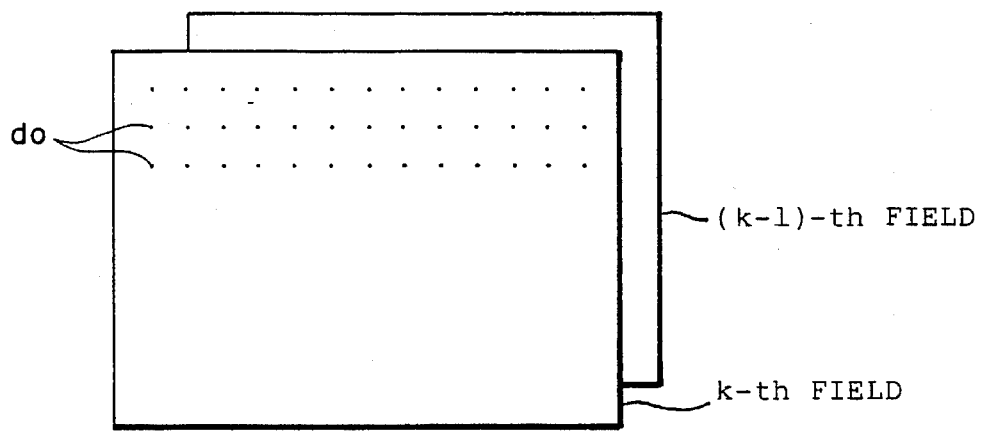
FIGS. 7a to 7c show how motion vectors at representative points are generated.
Figure 7B:
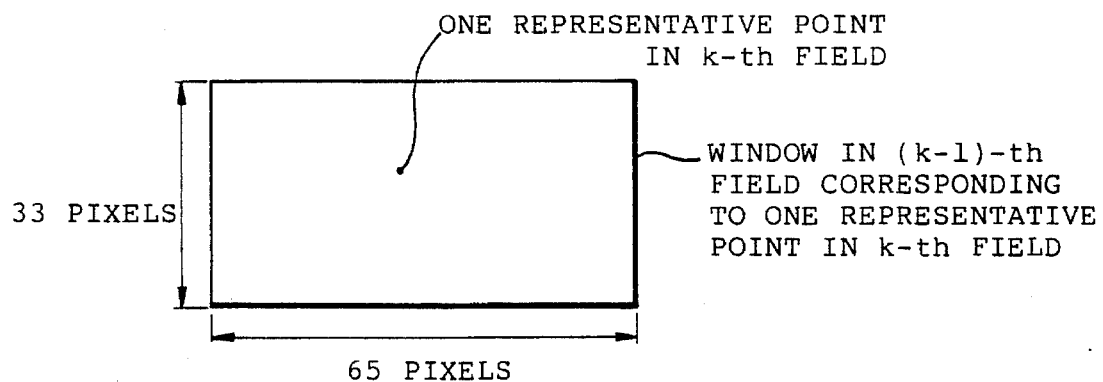
Figure 7C:
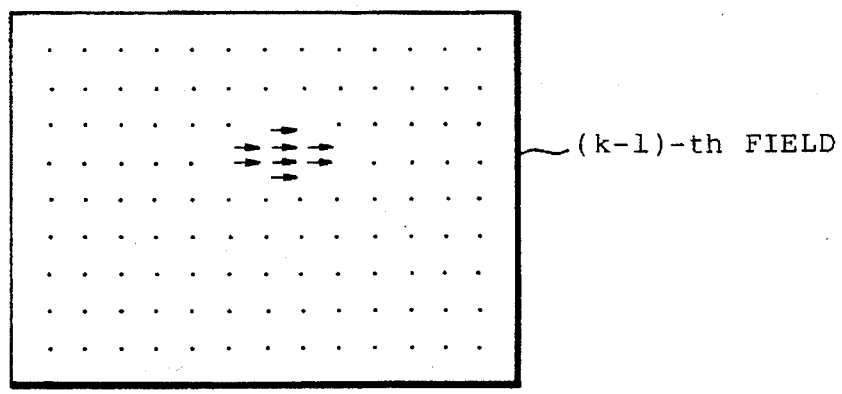

FIGS. 7a to 7c schematically show how motion vectors are calculated.

The representative point motion vector operation circuit 83 is a circuit for uniformly determining 100 to 1000 representative points (pixels) $d_0$ within a picture in the current field (in the k-th field) as shown in FIG. 7a and performing a correlating operation between the representative points $d_0$ in the k-th field and the pixels in the vicinity of a representative point in the (k−1)-th field which corresponds to the representative point $d_0$ (for example, upper and lower 16 pixels, and right and left 32 pixels (see FIG. 7b)), to calculate a motion vector at each of the representative points $d_0$ within the k-th field. Motion vectors at the representative points are calculated with respect to the entire picture in the k-th field by the representative point motion vector operation circuit 83. One example of the motion vectors at the representative points is shown in FIG. 7c.

The motion vectors at the representative points created by the representative point motion vector operation circuit 83 are given to a circuit for executing an interpolating operation of a motion vector (hereinafter referred to as a motion vector interpolating operation circuit) 84.

Motion vectors with respect to all pixels in one screen are generated by interpolation based on the motion vectors at the representative points by the motion vector interpolating operation circuit 84. The value (including the magnitude, the direction and the like) of the motion vector generated is given as an LPF-coefficient to a low-pass filter (LPF) 86.

Data representing the image in the k-th field is delayed by the delay line 85 for a time equal to delay time due to the processing performed by the representative point motion vector generation circuit 83 and the motion vector interpolating operation circuit 84. The data representing the image in the k-th field is delayed for the above described predetermined time by the delay line 85 and then, is applied to the the LPF 86.

The luminance data is subjected to low-pass filtering processing for each pixel or for a plurality of pixels by the LPF 86 depending on the LPF-coefficients given to the LPF 86 such that a high frequency component of the data representing the image in the k-th field is removed depending on the direction in which the image is moved, and a high frequency component in the wider frequency range is removed, the more violent the movement of the image is.

The image is blurred depending on the direction in which the image is moved and the violence of the movement by the filtering circuit shown in FIG. 6. Consequently, when a movie image is displayed on a monitor display device, an image moving more smoothly appears.

Although in the circuit shown in FIG. 6, the motion vector generation processing and the low-pass filtering processing are performed with respect to all the pixels, the motion vector generation processing and the low-pass filtering processing may be performed for one block comprising a plurality of pixel regions.

Figure 8:
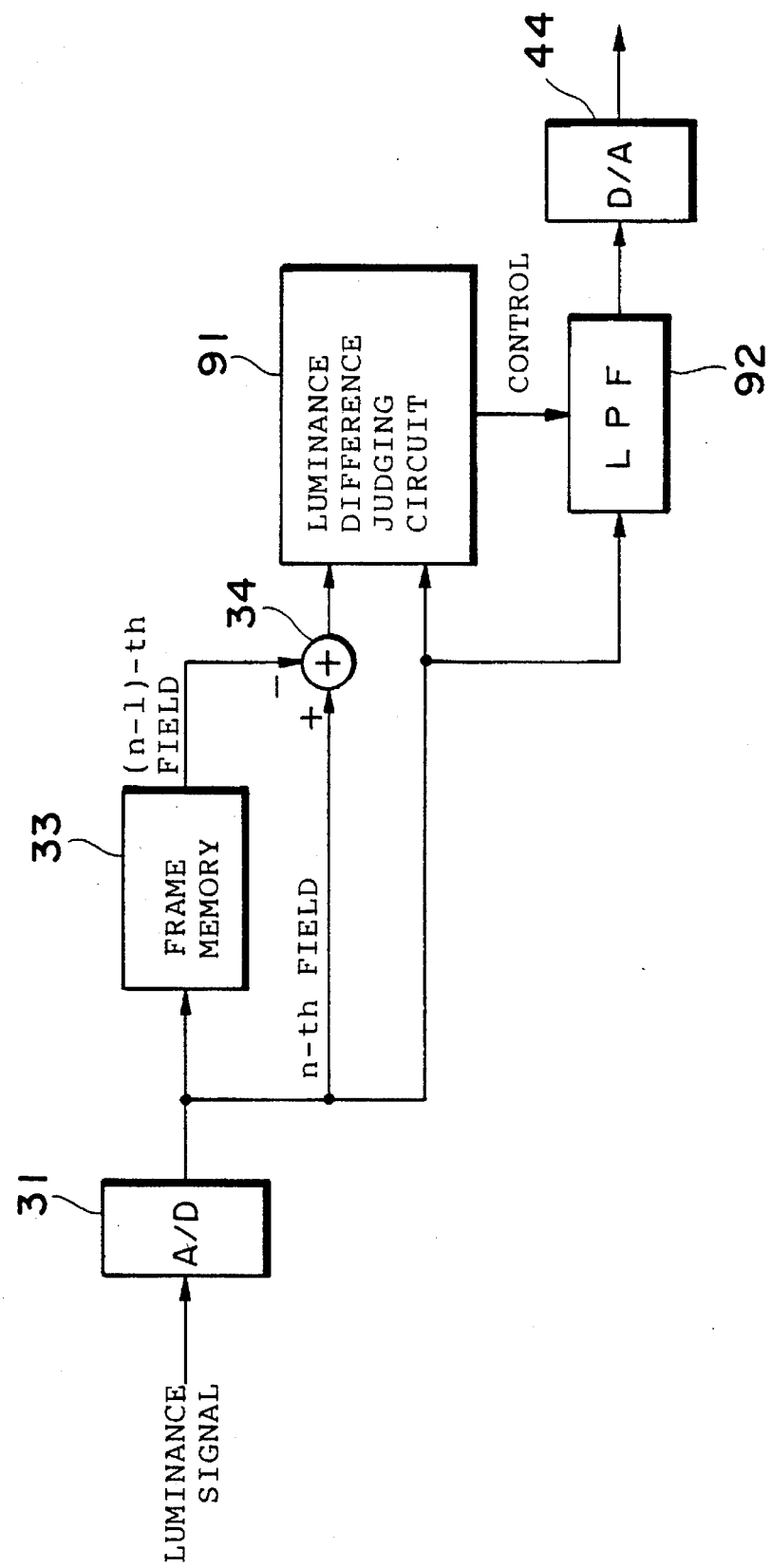
FIG. 8 is a block diagram showing still another example of the movement correcting circuit.
Figure 9A:
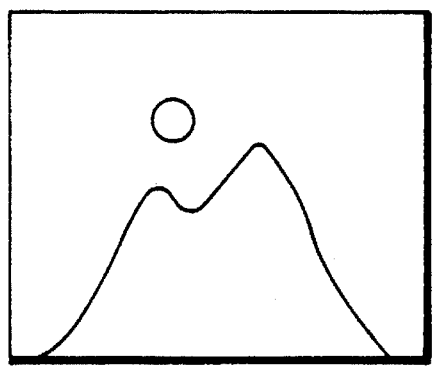
FIGS. 9a to 9d are schematic views showing how movement correction is made in the circuit shown in FIG. 8.
Figure 9C:
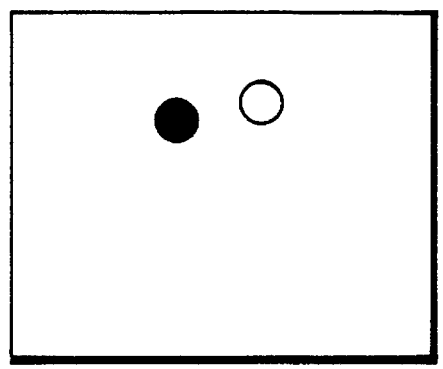
Figure 9B:
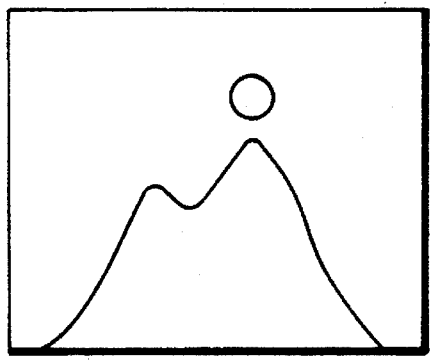
Figure 9D:
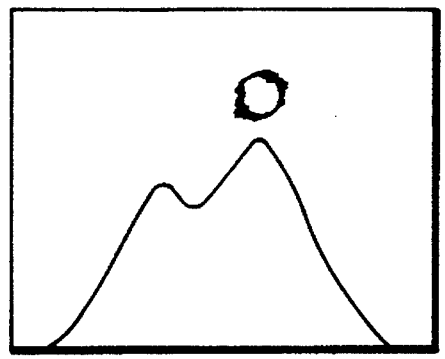

FIG. 8 is a block diagram showing the electrical construction of a further example of the movement correcting circuit 30 shown in FIG. 1. In FIG. 8, the same portions as those shown in FIG. 2 are assigned the same reference numerals and hence, the description thereof is omitted. FIGS. 9a to 9d schematically show how movement correction is made in the circuit shown in FIG. 8.

A luminance signal inputted to the movement correcting circuit is converted into digital luminance data in an analog-to-digital converting circuit 31. The digital luminance data is applied to a frame memory 33, a subtracting circuit 34, a luminance difference judging circuit 91, and an LPF 92.

The subtracting circuit 34 subtracts from luminance data representing the current image in the n-th field (see FIG. 9b) luminance data representing the preceding image in the (n−1)-th field (see FIG. 9a), to obtain data representing only moving image portions (see FIG. 9c) in both the images. The data representing the moving image portions is applied to the luminance difference judging circuit 91.

The luminance difference judging circuit 91 is a circuit for comparing two luminance data inputted to detect data in a region where the luminance difference therebetween is small. The data in the region where the luminance difference is small which is detected by the luminance difference judging circuit 91 is applied as control data to the LPF 92. The LPF 92 removes a high frequency component of the luminance data representing the current image in a region where the luminance difference between the luminance data representing the current image (see FIG. 9b) and the luminance data representing the moving image portions (see FIG. 9c) is small in response to the control data outputted from the luminance difference judging circuit 91. Output data of the LPF 92 represents an image obtained by blurring the moving image portion in the current image (see FIG. 9d). The output data of the LPF 92 is applied to a digital-to-analog converting circuit 44, to be converted into an analog luminance signal and outputted.

The moving image portion in the present image is blurred because the high frequency component is removed with respect to the moving image portion by the LPF 92, thereby to obtain an image which can be seen as smoothly moving.

Figure 10:
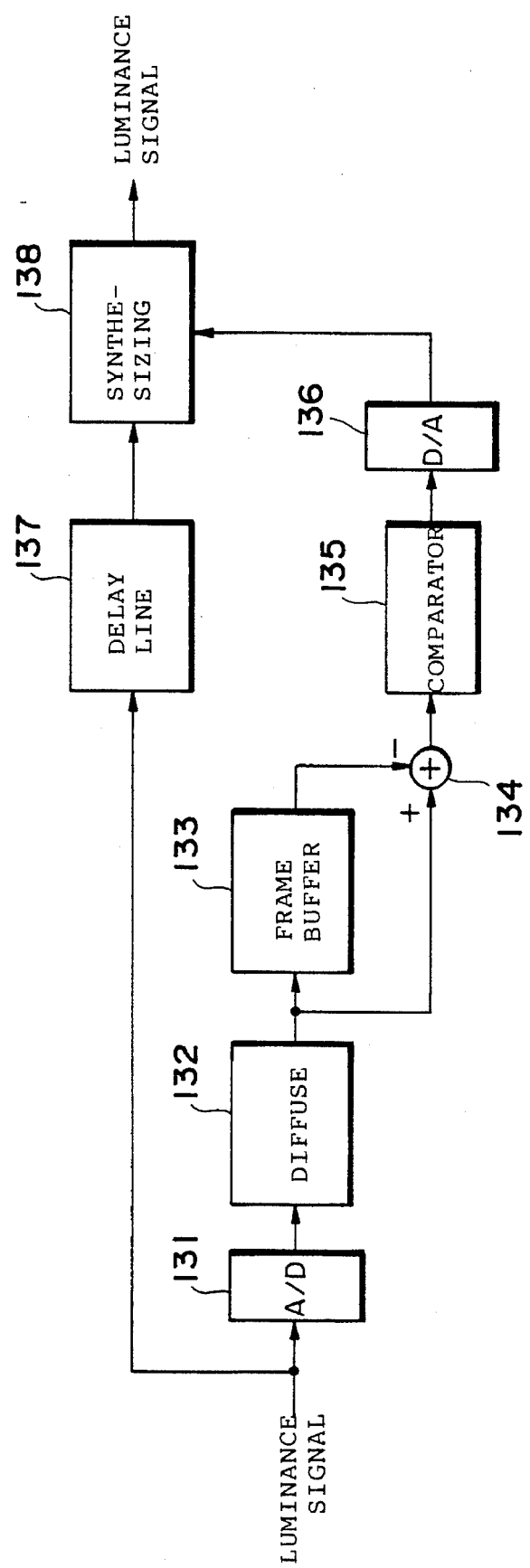
FIG. 10 is a block diagram showing the electrical construction of a further example of the movement correcting circuit.
Figure 11A:
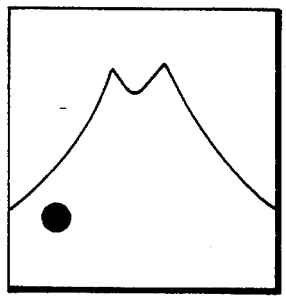
FIGS. 11a to 11g show how an image interpolated by the circuit shown in FIG. 10 is created.
Figure 11E:
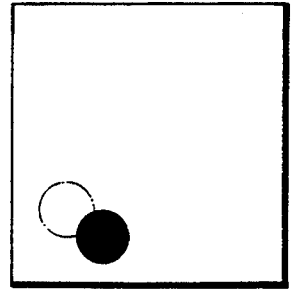
Figure 11B:
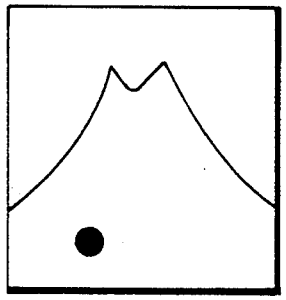
Figure 11F:
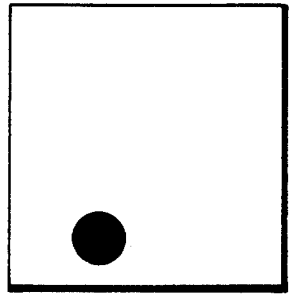
Figure 11C:
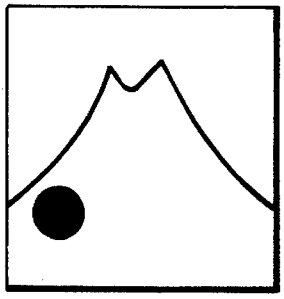
Figure 11G:
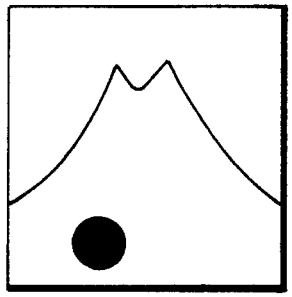
Figure 11D:
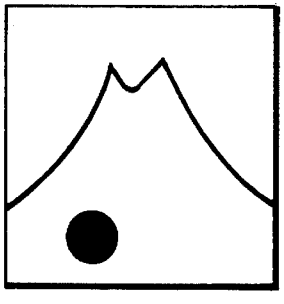

FIG. 10 is a block diagram showing the electrical construction of a still further example of the movement correcting circuit 30 shown in FIG. 1, and FIGS. 11a to 11g show how an image is subjected to movement correction. The movement correcting circuit shown in FIG. 10 is a circuit for performing correction processing with respect to a luminance signal.

A luminance signal Y outputted from the luminance signal processing circuit 14 (see FIG. 1) is applied to an analog-to-digital (A/D) converting circuit 113 and a delay line 137.

The luminance signal Y is converted into digital luminance data by the analog-to-digital converting circuit 113 and then, is applied to a diffuse circuit 132. The diffuse circuit 132 is a circuit for performing processing for blurring the contour of an image. The diffuse circuit 132 is a circuit for taking, for example, the average value of luminance values of a plurality of pixels as a luminance value of one pixel (for example, the pixel in the center) out of the plurality of pixels. Signal processing is so performed that the contour of an image (see FIG. 11a or 11b) represented by the signal inputted to the movement correcting circuit is blurred by the diffuse circuit 132 (see FIG. 11c or 11d).

The diffuse circuit 132 can be also achieved by a digital low-pass filter. Filtering processing is so performed that the contour of an image is blurred by the low-pass filter.

Data representing the image whose contour is blurred by the diffuse circuit 132 is applied to a frame buffer 133 and a subtracting circuit 134. The data inputted to the frame buffer 133 is delayed by one field and is outputted, to be applied to the subtracting circuit 134.

The subtracting circuit 134 subtracts from data representing the current image in the (n+1)-th field whose contour is blurred (see FIG. 11d) data representing the preceding image in the n-th field whose contour is blurred (see FIG. 11c), thereby to extract data representing moving image portions (see FIG. 11e) in the images in the (n+1)-th field and the n-th field.

The data representing the moving image portions whose contours are blurred is applied to a comparator 135. A noise signal component is removed by the comparator 135, and only data representing the moving image portion in the current image in the (n+1)-th field (see FIG. 11f) is extracted. The data representing the moving image portion in the current image is applied to a digital-to-analog (D/A) converting circuit 136, to be converted into an analog signal. The analog signal is applied to a synthesizing circuit 138.

The luminance signal representing the current image in the (n+1)-th field which is inputted to the movement correcting circuit is delayed by the delay line 137 for delay time due to the above described correction for blurring the contour of an image, to be applied to the synthesizing circuit 138. The luminance signal representing the current image in the (n+1)-th field and the signal representing the moving image portion in the current image in the (n+1)-th field which is outputted from the digital-to-analog converting circuit 136 are synthesized by the synthesizing circuit 136 (see FIG. 11g). An output signal of the synthesizing circuit 138 is an output signal of the movement correcting circuit.

The moving image portion in the current image is blurred. Even when the image is protected on a television or the like, therefore, a natural smoothly moving image is obtained.

Figure 12:
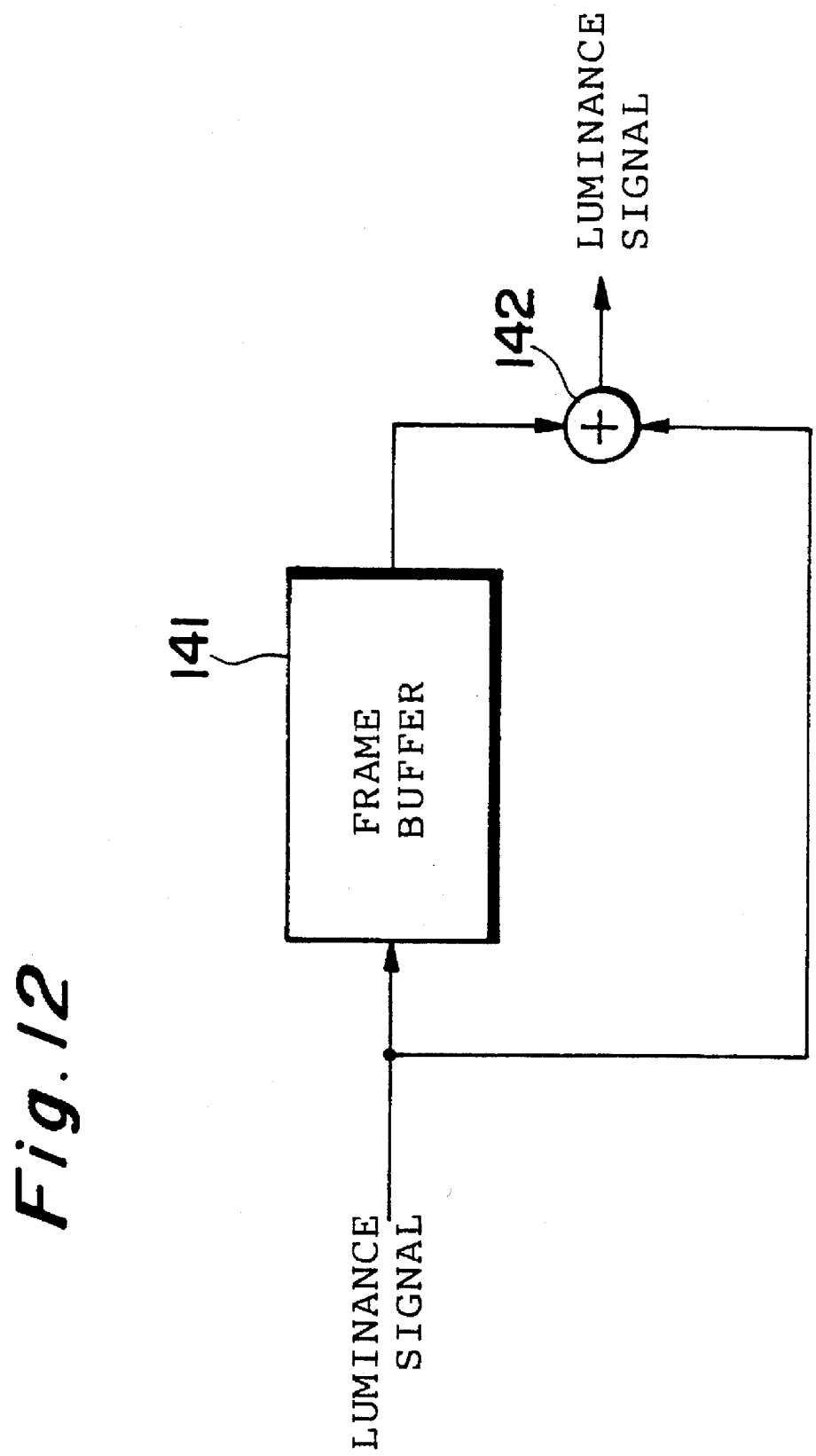
FIG. 12 is a block diagram showing the electrical construction of a still further example of the movement correcting circuit.

FIG. 12 shows the electrical construction of a still further example of the movement correcting circuit 30 shown in FIG. 1.

The movement correcting circuit shown in FIG. 12 is constituted by a frame butter 141 and an adding circuit 142.

A luminance signal outputted from the luminance signal processing circuit 14 (see FIG. 1) is applied to the frame buffer 141 and the adding circuit 142. The frame buffer 141 is a circuit for delaying an input signal by one field and outputting the same. An output signal of the frame buffer 141 is applied to the adding circuit 142. Data representing an image in the current field and data representing an image one field ahead of the image in the current field are synthesized by the adding circuit 142, so that composite data obtained is outputted.

Even if the movement correcting circuit is constructed as shown in FIG. 12, it is possible relatively simple to obtain an image smoothly moving which has continuity.

An analog-to-digital converting circuit and a digital-to-analog converting circuit are respectively connected to the preceding stage and the succeeding stage of the frame buffer 141.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video signal reproduction processing method comprising the steps of:

reading, from a recording medium on which a modulated movie video signal representing an image of a subject picked up at a shutter speed faster than $1/60$ of a second is recorded, a video signal;

subjecting the read video signal to reproduction processing including demodulation, to obtain a first video signal;

extracting, on the basis of the first video signal representing a current image frame and a video signal representing a preceding image one frame ahead of said current image frame, a difference signal representing moving image portions;

generating a signal representing an interpolated image based upon an interpolation of the extracted difference signal representing the moving image portions; and synthesizing said first video signal representing the current image frame and said generated signal representing the interpolated image, to obtain a second video signal to thereby provide for reproduction of the recorded video signal as both a sharp still image and a clear moving image.

2. The video signal reproduction processing method according to claim 1, wherein said step of extraction of the difference signal representing the moving image portions, said step of generation of the signal representing the interpolated image, and said step of synthesizing are performed with respect to a luminance signal component of the video signal.

3. The video signal reproduction processing method according to claim 1, wherein said step of extraction of the signal representing the moving image portions, said step of generation of the signal representing the interpolated image, and said step of synthesizing are performed with respect to each of a luminance signal component and a chrominance signal component of the video signal.

4. The video signal reproduction processing method according to claim 1, wherein said first video signal is selected and outputted as one of a print image output, a slow-motion output and a still image output, and said second video signal is selected and outputted as a movie image output.

5. The video signal reproduction processing method of claim 1, wherein the shutter speed is $1/120$ of a second.

6. A video signal reproduction processing apparatus comprising:

reading means for reading, from a recording medium on which a modulated movie video signal representing an image of a subject picked up at a shutter speed greater than $1/60$ of a second is recorded, a video signal;

reproduction processing means for subjecting the video signal read by said reading means to reproduction processing including demodulation, to obtain a first video signal;

extracting means for extracting, on the basis of the first video signal representing a current image frame and a video signal representing a preceding image one frame ahead of said current image frame, a difference signal representing moving image portions;

interpolated image creating means for generating a signal representing an interpolated image based upon an interpolation of the extracted difference signal representing the moving image portions, extracted by said extracting means; and synthesizing means for synthesizing said first video signal representing the current image frame and said generated signal representing the interpolated image, to obtain a second video signal to thereby provide for reproduction of the recorded video signal as both a sharp still image and a clear moving image.

7. The video signal reproduction processing apparatus according to claim 6, wherein said extraction of the difference signal by the extracting means, said generation of the signal representing the interpolated image by the interpolated image creating means, and said synthesizing by the synthesizing means are performed with respect to a luminance signal component of the video signal.

8. The video signal reproduction processing apparatus according to claim 6, wherein said extraction of the difference signal by the extracting means, said generation of the signal representing the interpolated image by the interpolated image creating means, and said synthesizing by the synthesizing means are performed with respect to each of a luminance signal component and a chrominance signal component of the video signal.

9. The video signal reproduction processing apparatus according to claim 6, further comprising switching means for switching between said first video signal and said second video signal, said first video signal being selected and outputted as one of a print image output, a slow-motion output and a still image output, and said second video signal being selected and outputted as a movie image output.

10. The video signal reproduction processing apparatus of claim 6, wherein the shutter speed is $1/120$ of a second.

* * * * *